(12) United States Patent
Forge et al.

(10) Patent No.: US 10,860,904 B2
(45) Date of Patent: Dec. 8, 2020

(54) PRINTING OPERATION MANAGEMENT SYSTEM

(71) Applicant: Quad/Graphics, Inc., Sussex, WI (US)

(72) Inventors: George Forge, Sussex, WI (US); Tara Hahn, Sussex, WI (US); Alan Leszcynski, Sussex, WI (US); Marcus Lancaster, Sussex, WI (US); James Patzer, Sussex, WI (US)

(73) Assignee: Quad/Graphics, Inc., Sussex, WI (US)

(*) Notice: Subject to any disclaimer, the term of this patent is extended or adjusted under 35 U.S.C. 154(b) by 0 days.

(21) Appl. No.: 15/706,281

(22) Filed: Sep. 15, 2017

(65) Prior Publication Data

US 2018/0082158 A1   Mar. 22, 2018

Related U.S. Application Data

(60) Provisional application No. 62/396,078, filed on Sep. 16, 2016.

(51) Int. Cl.
*G06K 15/02* (2006.01)
*B41F 33/00* (2006.01)
*G06Q 30/02* (2012.01)
*G06F 3/12* (2006.01)

(52) U.S. Cl.
CPC ....... *G06K 15/1809* (2013.01); *G06F 3/1219* (2013.01); *G06F 3/1275* (2013.01); *G06F 3/1282* (2013.01); *G06K 15/1823* (2013.01); *G06Q 30/0201* (2013.01); *G06Q 30/0202* (2013.01)

(58) Field of Classification Search
CPC ............ G06K 15/1809; G06K 15/1823; G06F 3/1219; G06F 3/1218; G06F 3/1275; G06F 3/1282; G06Q 30/0201; G06Q 30/0202
USPC .................................................. 358/1.15, 1.9
See application file for complete search history.

(56) References Cited

U.S. PATENT DOCUMENTS

| 2003/0144897 A1* | 7/2003 | Burruss | G06Q 30/02 705/7.31 |
| 2011/0116108 A1* | 5/2011 | Ha | G06F 3/1219 358/1.2 |
| 2011/0191139 A1* | 8/2011 | Hong | G06Q 10/087 705/7.31 |
| 2012/0218590 A1* | 8/2012 | Dumitrescu | G06F 3/1205 358/1.15 |

(Continued)

*Primary Examiner* — Quang N Vo
(74) *Attorney, Agent, or Firm* — Foley & Lardner LLP

(57) ABSTRACT

Systems and methods relating to generated printed products are provided. One system includes a transceiver configured to transmit commands to a printing press, the commands used by the printing press to execute print operations to generate printed products. The system further includes a processing circuit configured to receive data indicating a first amount of a printed product for a print operation. The processing circuit is further configured to determine a second amount of the printed product to be printed by modifying the first amount using a characteristic of the printed product. The processing circuit is further configured to transmit, using the transceiver, a first command to the printing press configured to cause the printing press to print the second amount of the printed product. In some implementations, a plant selection system determines where to print the product based on the amount to be printed and/or characteristics of the product.

14 Claims, 10 Drawing Sheets

(56) References Cited

U.S. PATENT DOCUMENTS

2013/0297670 A1\* 11/2013 Lundberg .............. G06F 3/1268
709/201
2016/0275047 A1\* 9/2016 Vincent ................. G06F 3/1243

\* cited by examiner

Search: [Orders Requiring Purchasing]   [Retrieve]
         805                              810

| ORDER | ISBN | TITLE | CUSTOMER | LOCATION | DIGITAL | ACCOUNT MANAGER | STATUS | REQ SHIP DATE | |
|---|---|---|---|---|---|---|---|---|---|
| 01346 | 9781123456789 | Title 1 | Customer 1 | Plant 1 | o | Bob Smith | PO Issued | 07/16/2017 | View |
| 01385 | 9781333444622 | Title 2 | Customer 1 | Plant 2 | o | Jane Doe | PO Issued | 07/23/2017 | View |
| 00366 | 9781553003631 | Title 3 | Customer 1 | Plant 5 | o | Bob Smith | PO Issued | 08/08/2017 | View |
| 01269 | 9780123888992 | Title 4 | Customer 1 | Plant 1 | o | Bob Smith | PO Issued | 08/11/2017 | View |
| 03422 | 9781094566788 | Title 5 | Customer 1 | Plant 3 | o | Jane Doe | PO Issued | 09/01/2017 | View |

Search: [Orders Awaiting Plant Selection ▼]  [Retrieve]

| ORDER | ISBN | TITLE | CUSTOMER | LOCATION | DIGITAL | ACCOUNT MANAGER | STATUS | REQ SHIP DATE | CREATED | LAST UPDATED |
|---|---|---|---|---|---|---|---|---|---|---|
| 002256 | 9781225564432 | Title 6 | Customer 1 | | o | Bob Smith | Tentative | 09/15/2017 | 08/12/2017 | 08/25/2017 |
| 001399 | 9781798764311 | Title 7 | Customer 1 | | o | Jane Doe | Tentative | 10/20/2017 | 08/12/2017 | 08/25/2017 |
| 003324 | 9781888555467 | Title 8 | Customer 1 | | o | Bob Smith | Tentative | 10/01/2017 | 08/12/2017 | 08/25/2017 |

FIG. 9

| ORDER | ISBN | TITLE | CUSTOMER | LOCATION | DIGITAL | ACCOUNT MANAGER | STATUS | REQ SHIP DATE | |
|---|---|---|---|---|---|---|---|---|---|
| 003445 | 9781589068403 | Title 9 | Customer 1 | Plant 1 | | Bob Smith | PO Issued | 10/15/2017 | View |
| 005623 | 9781984385960 | Title 10 | Customer 1 | Plant 5 | o | Bob Smith | PO Issued | 10/20/2017 | View |
| 007223 | 9781323355699 | Title 11 | Customer 1 | Plant 2 | o | Bob Smith | PO Issued | 11/01/2017 | View |

Search: Orders Waiting to Start Production    [Retrieve]

FIG. 10

| ORDER | ISBN | CUSTOMER | SEASON | ADJUSTMENT TYPE | SAVINGS | CREATED BY | |
|---|---|---|---|---|---|---|---|
| 00222 | 9781987395893 | Customer 1 | Summer 2017 | Automatic | $514.50 | (Automatic) | View |
| 00234 | 9781054204389 | Customer 1 | Summer 2017 | Automatic | $432.03 | (Automatic) | View |
| 00566 | 9781438965820 | Customer 1 | Summer 2017 | Automatic | $8,664.30 | (Automatic) | View |
| 00687 | 9876439850283 | Customer 1 | Winter 2017 | Automatic | $2,599.24 | (Automatic) | View |
| 001002 | 9870452309560 | Customer 1 | Winter 2017 | Automatic | $1,397.99 | (Automatic) | View | prev  1  2  3  4  5  NEXT

FIG. 11

PRINTING OPERATION MANAGEMENT SYSTEM

CROSS-REFERENCE TO RELATED APPLICATIONS

The present application claims priority to and the benefit of U.S. Provisional Patent Application No. 62/396,078, filed Sep. 16, 2016, which is incorporated herein by reference in its entirety.

BACKGROUND

The present disclosure generally relates to printing operations performed using printing devices such as printing presses. According to exemplary embodiments, the disclosure relates more particularly to managing orders to print multiple copies of a printed product on a printing press.

Commercial printing customers often order large quantities of a printed product with limited certainty about the actual demand for the product. Estimating the printing quantity incorrectly can lead to a variety of problems. For example, printing a substantially greater number of copies of a product than are demanded can result in excess cost to the customer, need to store excess inventory, use of operating time of the printing press for undesired copies of a product, etc. On the other hand, printing a lower number of copies of the product than are demanded can result in a demand for additional copies to be printed in a small quantity and/or on a short timeframe, which can be difficult and/or expensive to meet with certain types of commercial printing operations.

SUMMARY

One implementation of the present disclosure relates to system including a transceiver configured to transmit commands to a printing press, the commands used by the printing press to execute print operations to generate printed products. The system further includes a processing circuit configured to receive data indicating a first amount of a printed product for a print operation to generate the printed product using a printing press. The processing circuit is further configured to determine a second amount of the printed product to be printed by the printing press under the print operation by modifying the first amount using a characteristic of the printed product. The processing circuit is further configured to transmit, using the transceiver, a first command to the printing press configured to cause the printing press to print the second amount of the printed product.

Another implementation of the present disclosure relates to a system including a processing circuit configured to receive data indicating a first amount of a printed product for a print operation to generate the printed product using a printing press. The processing circuit is further configured to determine a second amount of the printed product to be printed by the printing press under the print operation by modifying the first amount using a characteristic of the printed product. The processing circuit is further configured to generate output data indicating the second amount to the printed by the printing press.

Yet another implementation of the present disclosure relates to a method including receiving, by a processing circuit, data indicating a first amount of a printed product for a print operation to generate the printed product using a printing press. The method further includes determining, by the processing circuit, a second amount of the printed product to be printed by the printing press under the print operation by modifying the first amount using a characteristic of the printed product. The method further includes generating, by the processing circuit, output data indicating the second amount to the printed by the printing press.

BRIEF DESCRIPTION OF THE DRAWINGS

FIG. 8 is a user interface showing orders requiring purchasing according to an illustrative embodiment.

FIG. 9 is a user interface showing orders awaiting plant selection according to an illustrative embodiment.

FIG. 10 is a user interface showing orders waiting to start production according to an illustrative embodiment.

FIG. 11 is a user interface showing ledger entries according to an illustrative embodiment.

DETAILED DESCRIPTION

Figure 1:
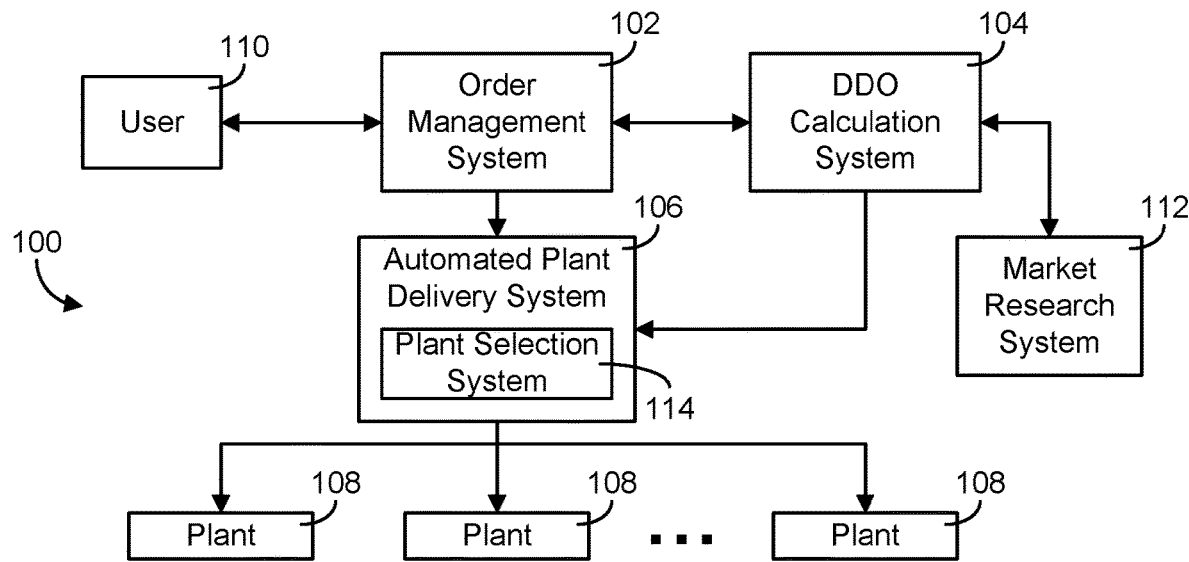
FIG. 1 is a block diagram of a demand driven order (DDO) system according to an illustrative embodiment.

Referring generally to the Figures, systems and methods are provided for managing printing operations to be performed on printing presses. According to exemplary embodiments, a system may determine an initial amount of the printed product to be printed by the printing press. For example, the initial amount may be an amount received from a print customer or other user of the system. The system may determine an adjustment to the initial amount to determine a final amount of the printed product to be printed by the printing press. The adjustment may be determined using a characteristic of the printed product, such as a current life cycle stage of the printed product, whether the printed product is compatible with printing on a particular type of press (e.g., digital press), a title value of the product, a current season for the product, etc. In some embodiments, this final amount may be sent to the user for confirmation that the user wishes to print the final amount of the printed product or, optionally, modify the amount. In some embodiments, a command to print the final amount may be transmitted to one or more printing presses configured to print the final amount of the printed product in response to the command.

The final amount of copies may be determined by applying one or more rules to the initial amount, where the rules relate to one or more characteristics of the printed product. The rules may be designed to balance cost and efficiency savings of avoiding printing more copies of the printed product than are demanded with a risk of having to print a small quantity of additional copies if the final amount is lower than the actual demand. In some embodiments, the system may determine whether the printed product is compatible with printing by a particular type of printing press, such as a digital printing press. A digital printing press may be capable of printing a small quantity of additional copies of the printed product more quickly and/or more cost-efficiently than some other types of presses, such as web-offset printing presses. If the printed product is compatible with printing by a digital printing press, the system may apply a greater reduction to the initial amount to determine the final amount than if the printed product is incompatible with printing by a digital press. In some embodiments, the system may additionally or alternatively determine the final amount using a life cycle stage, title value, season, and/or other characteristics of the printed product. For example, the system may apply a greater reduction to the initial value to determine the final value if the printed product is at a later life cycle stage (e.g., if the version of the product being printed has been superseded by a more recent version) than if the printed product is at an earlier life cycle stage (e.g., if the version of the product being printed was published in the current year).

The systems and methods of the present disclosure provide several advantages. For example, exemplary embodiments disclosed herein may help ensure efficient utilization of printing press resources to ensure available time on printing presses is used to more accurately meet anticipated demand. By avoiding printing an excess number of copies of the product, cost savings (e.g., less wasted inventory, less storage space for inventory) may be provided to the user. Exemplary embodiments may also reduce a risk of under-estimating demand for the printed product and processing small quantities of product, possibly on a short timeframe, which may also help ensure efficient utilization of printing press resources and avoid utilizing printing resources in a costly or inefficient manner (e.g., avoid printing smaller quantities of product on less cost-efficient types of presses).

Referring now to FIG. 1, a block diagram of a demand driven order (DDO) system 100 is shown according to an exemplary embodiment. In the illustrated embodiment, the DDO system 100 includes an order management system 102, a DDO calculation system 104, and an automated plant delivery system 106. A user 110 provides an order to the DDO system 100. The order includes a product to be printed and a quantity of the product. The DDO calculation system 104 receives the order and calculates an adjustment of the order (e.g., an increase or decrease in quantity of the product to be printed). In some embodiments, the order management system 102 presents the adjusted order amount to the user 110 and may generally be responsible for facilitating user actions with the DDO system 100. In some such embodiments, the order management system 102 may receive a message indicating approval of the adjusted amount from the user and provide the adjusted amount to the automated plant delivery system 106, which coordinates the execution of the order (e.g., the printing of the product) by one or more printing presses (e.g., lithographic presses, gravure presses, digital presses, etc.), for example at one or more plants 108. In some implementations, the order management system 102 or DDO calculation system 104 may transmit the final amount to the automated plant delivery system 106 without approval from the user. In some implementations, the final amount may not be transmitted for automatic implementation on a printing press, but may be provided as a recommended amount to the user and, if approved, the printing operation using the final amount may be manually implemented on one or more presses. While the present disclosure generally discusses print operations by printing presses, the features of the present disclosure may be applied to printing devices other than printing presses, including, but not limited to, office copier/fax devices and/or office printers.

The order management system 102 may generally facilitate communications with a user 110. For example, the order management system 102 may receive an order from the user 110. The order includes details about the product to be printed. For example, if the product is a book, the details may include the length of the book, the type of material the book is to be printed on, the type/content of text or imagery to be printed, and other such properties. The order further includes the quantity of the product to be printed. The user 110 may further provide additional details about the product to be printed that can be used by the DDO calculation system 104. For example, for a book, such information can include a title and/or subject of the book, the author(s) of the book, a time at which the book will be released, and the like. The information may be used by the DDO calculation system 104 as described below to help determine adjustments to the initial quantity of the product to determine a final quantity to be printed by the printing press.

The order management system 102 may present a user interface in which the user 110 can submit order information. As one example, the user interface may be presented on a browser on a user device, such as a personal computing device (e.g., desktop computer), mobile device (e.g., laptop computer, tablet, smartphone, etc.), or other type of user device. The user 110 may enter order information in any format via the user interface (e.g., via one or more forms, drop down boxes, text boxes, buttons, file uploads in a standard or proprietary format, such as a comma separated value format, etc.) and it should be understood that the methods of providing information by the user 110 may vary without departing from the scope of the present disclosure.

The order management system 102 provides the order information to the DDO calculation system 104. The DDO calculation system 104 may further receive information about the user 110, the product to be printed, and/or other information to determine a potential adjustment to the order amount. In some implementations, this further information may be received and/or obtained from data sources other than the user device, including third-party data sources. For example, data regarding a current life cycle state of a particular publication to be printed may be obtained from a data source, such as a third-party repository or database indicating publication dates correlated to identifiers of publications. The adjusted order generated by the DDO calculation system 104 suggests a modified quantity of the product to be printed, which may differ from the quantity specified by the user 110.

DDO system 100 is shown to include a market research system 112. In some embodiments, the DDO calculation system 104 may receive an input from the market research system 112 to be used in the calculation of the modified quantity. The market research system 112 may retrieve or receive one or more characteristics, such as a historical trend of a type of book, a trend relating to the popularity of an author or subject of a book, and the like. In some embodiments, the market research system 112 may retrieve various characteristics from sources such as online retailers or large outlets (e.g., Amazon, Barnes & Noble, eBay, etc.) that sell products relevant the product submitted by the user for printing. As another example, the market research system 112 may receive input from a company or other entity which collects and aggregates data (e.g., Nielsen), which can be used in the calculation. In some embodiments, the DDO calculation system 104 may use data and characteristics received by the market research system 112 and apply them to the calculation. For example, if a particular product appears to be trending based on data received from market analysis/panel analysis data, the DDO calculation system 104 may increase a number of copies to be ordered accordingly. In other embodiments, the market research system 112 may receive the data and determine its own characteristics and parameters to be applied in the calculation by the DDO calculation system 104.

In some embodiments, the market research system 112 may use business market segmentation (i.e., dividing a potential buying market for the product into different groups). The groups may be separated by, for example, location, wants, disposable income, buying trends, and the like. The market research system 112 may then analyze the market analysis data to determine a potential book sales performances in each group, and may impact the calculation of the modified quantity of product to be printed. It should be understood that the market research system 112 may perform any number of analysis steps for determining how the calculation is to be adjusted, or may provide existing data to the DDO calculation system 104. The activities of the DDO calculation system 104 and the market research system 112 is described in greater detail in FIG. 2 according to an illustrative implementation.

In some embodiments, the DDO calculation system 104 determines an adjusted order amount, and the order management system 102 provides the adjusted order to the user 110 for approval or analysis via the user interface. The user 110 may then choose to accept the adjusted order, reject the adjusted order, or modify the adjusted order. If the user 110 accepts the adjusted order, in some embodiments, the automated plant delivery system 106 receives the adjusted order and arranges for the product to be printed based on the adjusted order. If the user 110 rejects the adjusted order, in some embodiments, the automated plant delivery system 106 receives the original order and arranges for the product to be printed based on the original order. In other embodiments, the user 110 may modify the adjusted order amount. In some such embodiments, the automated plant delivery system 106 receives the modified amount and causes the modified amount to be printed by one or more printing presses. In some such embodiments, the DDO calculation system 104 re-analyzes a modified order amount and provide a new adjusted order amount based on the analysis of the modified amount from the user. It should be understood that the DDO system 100 may go through any number of iterations in its calculation of an adjusted order.

The automated plant delivery system 106 is shown to include a plant selection system 114 configured to select one or more plants 108 for printing the product. The plant selection system 114 may generally use the order details to determine one or more suitable plants 108 for printing. In various embodiments, the plant selection system 114 may use a priority order or ranking for each order to determine which orders should be sent out first. Further, the plant selection system 114 may take into account the current workload at each plant 108 to ensure that no single plant is overloaded. The plant selection system 114 may identify information needed to select a plant 108 (e.g., the plant selection system may request a priority or other user input before assigning an order). The plant selection system 114 activity is described in greater detail in FIG. 6.

The product may be printed at one or more printing presses at one or more plants 108 (or other facilities). Different plants 108 may have different types of printing presses or different printing capabilities. For example, printing operations may be fulfilled using one or more of a variety of types of printing presses, including lithographic presses (e.g., web-offset presses), gravure presses, digital presses, etc. Some types of printing presses (e.g., web-offset presses) are better equipped to print large quantities of printed product quickly and cost-efficiently, but may be more difficult and/or costly to use for printing smaller quantities of product in a short timeframe. Other types of printing presses (e.g., digital printing presses) may be better equipped to print smaller quantities of product, but may generally cost a higher per-quantity amount to print than other types of presses (e.g., web-offset presses). The capability of each printing press and/or plant may be factored into the selection of one or more presses/plants by the automated plant delivery system 106. The automated plant delivery system 106 selects one or more presses at one or more plants 108 at which the product should be printed, based on the printing presses available at each plant, the type of printing presses or the printing capability at each plant, the location of the plant (e.g., in relation to a delivery or distribution location of the printed product), the current workload at each plant, and other such information.

In the present disclosure, books are provided as examples of the product for which orders can be modified. It should be understood that the example of books is not limiting, and that the systems and methods herein can be implemented for other types of products which can be printed or manufactured, such as periodicals (e.g., magazines or newspapers), trade publications, etc. Further, while printing is described as the manufacturing process in the present disclosure, it should be understood that the systems and methods herein may be applied for other types of manufacturing processes.

Figure 2:
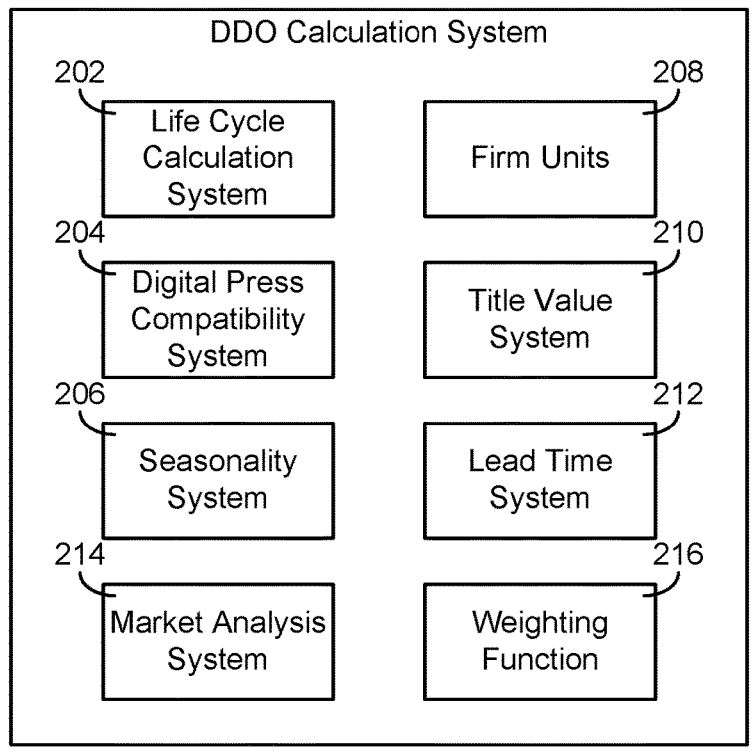
FIG. 2 is a detailed block diagram of the DDO calculation system of the DDO system according to an illustrative embodiment.

Referring now to FIG. 2, a more detailed block diagram of the DDO calculation system 104 is shown according to an illustrative embodiment. The DDO calculation system 104 receives an order and order parameters from the user 110 and calculates an adjusted order. The adjusted order may include a decrease in the quantity of product specified by the user in the order. The quantity may be adjusted based on various factors as described below. While various embodiments described herein discuss the adjustment applied in terms of a reduction in quantity from the initial quantity, it should be understood that the adjustment could also be an increase from the initial quantity as well.

The DDO calculation system 104 is shown to include various subsystems, each of which may be configured to account for a different factor that may impact how much of a product will be or might be demanded. In general, each subsystem may help quantify a risk associated with adjusting an order. When adjusting an order, such as reducing the quantity of product to be printed, there may be a general risk associated with the adjustment, as it may be costly to the manufacturer if not enough product is initially created and smaller orders are placed at a later time to fill unanticipated demand. For example, returning to print additional copies of a product after the initial adjusted order was fulfilled may be cost-inefficient and difficult to fulfill within a desired timeframe. In some implementations, each subsystem may be implemented as computer-executable instructions configured to implement different rules or functions when executed by a processor.

The DDO calculation system 104 includes a life cycle calculation system 202. In some implementations, the life cycle calculation system 202 calculates an impact on the demand potential of a product based on when the product will be released, whether the version of the product to be printed is a current version or an older version, and/or other factors. It should be understood that the life cycle of the product may be defined differently for different products. In some implementations, the DDO calculation system 104 may define the life cycle based in part on parameters defined by the user (e.g., definition of what characteristics of the product correspond to different life cycle status levels).

Using a book as an example, the DDO calculation system 104 may determine a publication date of the book. In some embodiments, the user 110, when submitting a book order, may indicate a publication date of the book. In some embodiments, the user 110 may provide an identifier for the book (e.g., an identifier that uniquely identifies the book, including, in some implementations, the particular version of the book to be printed in the event the book has multiple versions), and the publication date may be retrieved from a database correlating the identifier to the publication date. The publication date, in one embodiment, may be the publication year; in other embodiments, the publication date may identify a more particular time of year, month, or day. The publication date may generally identify when the book was originally released or will be released. The DDO calculation system 104 may further determine the order date of the book. The order date, in one embodiment, may be the current date (e.g., day, month, and/or year); in other embodiments and/or instances, the order date may be a date in the future (e.g., if an order is placed late in the calendar year, the year of the order date may be set by the system 202 as the following year). The order date may generally identify when the order is requested or when the order is expected to be fulfilled (e.g., when the books will be printed and/or delivered). In one embodiment, as described in the present disclosure, the publication date and order date include a publication year and order year; in other embodiments, the publication date and order date may be more precise.

As discussed above, in some embodiments, the user 110 may identify the printed product to be printed according to an identifier of a publication. The identifier may be used by DDO system 100 to identify the publication, including, in some embodiments, an edition or version of the book. In some embodiments, the identifier may be an International Standard Book Number (ISBN) for the book. The ISBN can be used by the life cycle calculation system 202 to determine if the book has multiple versions, and if the latest version is the version provided by the DDO system 100 by the user 110.

The life cycle calculation system 202 determines a current stage of the life cycle of the book. The life cycle of the book may vary based on the type of book and the number of versions of the book. For example, some books such as textbooks may be typically used in a school setting, and a new version of the textbook may be created every year, every two years, etc. Therefore, the life cycle of the book being ordered may be relatively short. As another example, books such as novels may typically not have many versions (e.g., may have only a single version), or only release new versions every few years. The life cycle may be relatively long for such books. In some embodiments, a life cycle of a book may be split into the following stages: "publication" (e.g., the book is a new book or new version that is just being released), "mid-life" (e.g., the book is not brand new but is still relevant), "end of life" (e.g., the book is about to be superseded by a new version, or is relatively old), and "superseded" (e.g., a newer version of the book has already been released). In various embodiments, the life cycle of the book may be split into any number of stages, and the parameters defining each category may vary.

Figure 4:
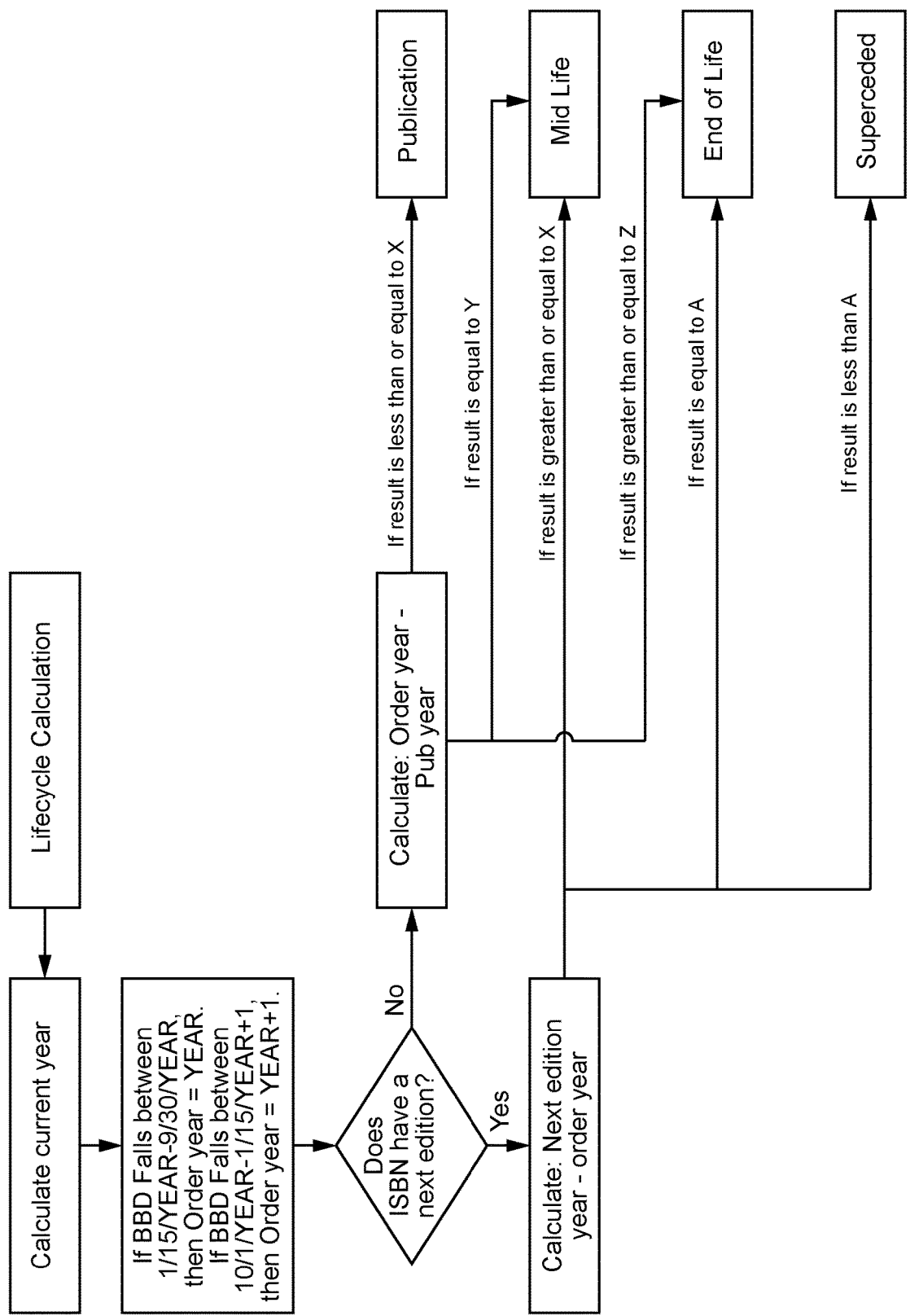
FIG. 4 is a flow diagram of a process for determining a life cycle status according to an illustrative embodiment.

One example decision process of determining a stage of the life cycle for a book is described below. If the version of the book to be printed is the latest version of the book (e.g., as determined using the ISBN of the book), then the life cycle calculation system 202 may calculate the difference between the order date and publication date. If the difference is less than a threshold (e.g., one year), the book may be classified in the "publication" stage. If the difference is greater than a threshold value (e.g., three years), the book may be classified in the "end of life" stage. Otherwise the book may be classified in the "mid-life" stage. If the version of the book to be printed is not the latest version of the book, the life cycle calculation system 202 may calculate the difference between the publication date of the newest version of the book and the order date. For example, the life cycle calculation system 202 may subtract the order date from the publication date. If the difference is less than zero (e.g., the newest version of the book has already released), the book may be classified in the "superseded" stage. If the difference is greater than a threshold (e.g., one year), the book may be classified in the "end of life" stage. Otherwise, the book may be classified in the "mid-life" stage. A visual illustration of this exemplary implementation of the life cycle status determination is shown in FIG. 4.

In some implementations, the life cycle stage may be determined using factors other than or in addition to the age of the publication or whether a newer version than the version to be printed exists. For example, certain factors may cause an older publication to be popular again or may restart a life cycle of the publication. Using trade publications as one example, a particular food trade publication that is many decades old may become popular again with a recent rise in popularity of food authors. In some implementations, corollary and/or primary demand, such as demand arising from market conditions relating to the publication (e.g., a rise or drop in popularity of other authors related to the author, other publications having a similar subject matter as the publication, etc.) may be considered in determining the final amount of printed product to be printed. In some such implementations, the demand may be accounted for by adjusting or restarting a life cycle of the publication (e.g., assuming that the book will be very popular when the corollary demand is determined to peak and less popular as time passes after that point) or determining the current life cycle stage to be at a beginning or middle stage despite the old age of the publication. In some such implementations, the demand may be accounted for within a title value rating for the publication (discussed in greater detail below).

The DDO system 100 may determine an adjustment to an initial order amount depending on the stage of the book. For example, if the book is in the publication stage, the DDO system 100 may not adjust the initial amount, or may apply a small adjustment to the order amount. If the book is in a superseded stage, the DDO system 100 may apply a greater reduction to the initial order amount to determine the final amount. When a book is at a superseded stage in its life cycle, there may be a higher chance that there will be lower demand for the book and excess copies will not be purchased quickly, as consumers may purchase the more recent version of the book or a different title instead. In some embodiments, the DDO calculation system 104 may determine a life cycle stage adjustment factor based on the determined life cycle stage. For example, the DDO calculation system 104 may determine the adjustment factor based on correlations between life cycle stages and corresponding adjustment factors for each stage stored in a memory. The life cycle stage adjustment factor may be used alone or in combination with other factors to determine an adjustment to apply to the initial order amount to determine the final amount of product to be printed.

The DDO calculation system 104 includes a digital printing press compatibility system 204. The digital printing press compatibility system 204 receives the order details from the order and determines various parameters for the printing of the product which may impact the ability to fulfill the order using a certain type of press. For example, some books may not be conducive to printing on digital printing presses due to particular logistics (e.g., limitations in types of product that can be printed using a digital printing press). If a particular book cannot be printed on a digital printing press, or the printing is likely to be slow or error-prone or result in a lower quality of printed product, the DDO system 100 may generally be less aggressive in reducing the initial order amount to determine the final amount. In some embodiments, if the printed product is determined to be incompatible with printing on a digital press, DDO calculation system 104 may determine that no downward adjustment of the initial amount should be applied, and the order should be printed as originally placed. While the present disclosure discusses analyzing compatibility with digital printing presses, it should be appreciated that compatibility with any type of printing press or other printing device may be considered as part of the decision to adjust or not adjust the initial amount.

Using books as an example, one example parameter that may be identified by the digital printing press compatibility system 204 is the paper type (e.g., the type of paper on which the book should be printed). Some printing presses may not be capable of printing a book on certain paper type, may take longer to print on certain paper types, may print less reliably or with lower quality on certain paper types, etc. Example paper types may generally include coated paper, uncoated paper, special fine paper, etc. The compatibility may further vary based on the weight of the paper, the opacity of the paper, and the like.

Another example parameter that may be identified is the number of colors to be used in printing of the book. For example, some books (e.g., text-only books) may be printed in only black-and-white. Other books may include images or other color-based content that may require printing on a press having ability to render a particular number of type of colors.

Another example parameter that may be identified is the bind type of the book. For example, the book may be hardcover or case bound, or may be bound using any other type of fastening method. Another example parameter that may be identified is the trim size of the book. The trim size generally defines the size of the pages of the book.

The various parameters identified by the digital printing press compatibility system 204 are used to determine the capability of various types of printing presses to print the book. For example, some printing presses may take longer to print based on the number of colors used or the type of paper used. In other words, some books may be more conducive to printing on digital printing presses than other books. The risk tolerance for adjusting a quantity of books ordered by a user may be lower if the book cannot be printed on digital printing presses compared to other printing presses; that is, the digital printing press compatibility system 204 may apply a smaller adjustment, or no adjustment, to the initial amount if the product cannot be printed on a digital press (e.g., to account for the fact that printing additional copies in small quantities would be difficult and costly). In some embodiments, each of the factors considered by the digital printing press compatibility system 204 may be assigned a value, and a final digital compatibility adjustment factor may be calculated based on the combination of the individual values (e.g., a weighted combination, with weights assigned to the factors based on importance of the factors to determining whether the product can be printed on a digital press). The digital compatibility adjustment factor may be considered alone or in combination with other factors described herein to determine the adjustment to apply to the initial order amount. In some embodiments, the digital printing press compatibility system 204 will determine there should be no adjustment to the initial order amount if the product is incompatible with digital press printing. In some embodiments, different adjustment factors may be mapped to different levels of compatibility; for example, a reduction factor of 0% if the product is incompatible with printing on a digital press, 3% if compatibility is low, 5% if compatibility is moderate, 10% if compatibility is high, etc.

The DDO calculation system 104 includes a seasonality system 206. The seasonality system 206 determines one or more parameters related to when the product is being published and released, and how the parameters may impact the sales of the product. For example, the parameters may indicate when the product is most likely to sell.

As one example, assume that the product is a textbook for use in schools. Textbooks may generally be sold at the start of a semester (e.g., fall and spring). If the order comes in during an off-peak season such as the early summer, the DDO system 100 may apply a greater reduction to the order. Orders during an off-peak season may be more speculative regarding demand than those placed during or near peak season (e.g., the student population is not yet firmly set), and there may be time to compensate for any difference between the adjusted number and unanticipated demand before the peak selling period. If the order comes in during a peak season, such as the end of summer or beginning of fall (e.g., a week before a start of many school terms), the DDO system 100 may apply a smaller adjustment or no adjustment and to follow the order request from the user 110. In general, the seasonality system 206 may determine when the order is being placed and when the book is most likely to sell, and determine a difference between the dates. Data used to determine the seasons for the publication may be obtained from the user 110 and/or from a third party. In various embodiments, different books may have different seasonality patterns, which are identifiable by the seasonality system 206. In some embodiments, a different seasonality adjustment factor is determined based on whether the current season is a peak or an off-peak season. In some embodiments, the adjustment factor may be more granular (e.g., several values out of a set of multiple values determined based on how close the current date is to a peak season).

The DDO calculation system 104 includes a sold units system 208. The sold units system 208 may determine the quantity of product already sold by the user 110 (e.g., products for which purchase orders or other firm offers have already been established). The quantity may be identified by the user 110 when submitting the order, may be inferred by the DDO system 100, or may be received from another source. The amount of sold products may be factored into the adjustment of the order; if the proportion of the ordered amount that is the subject of a firm offer or pre-sale is higher, the initial order amount may be reduced by a smaller amount or not reduced as there is a lower chance of the initial order amount exceeding demand.

The DDO calculation system 104 includes a title value system 210. The title value system 210 determines the value of the product to be printed. The value of the product may be related to how likely the product is to sell and/or a potential revenue (e.g., per-unit or total revenue), and may be based on characteristics or an identity of the author and/or the subject matter of the title. In some embodiments, the title value system 210 may estimate the popularity of the product. If the product is likely to sell few copies, there may be more risk that excess printed product may sit for a long period of time in inventory and not sell. If the product is likely to be popular, the DDO system 100 may be less likely to reduce the quantity of the order specified by the user 110.

Using books as an example, the title value system 210 may determine the value of the book based on factors such as: the author of the book (e.g., more famous authors are more likely to sell books), the subject or genre of the book (e.g., certain textbooks on advanced subjects may sell less copies), the content of the book, if the book is part of a series (e.g., the book is an encyclopedia part of a set, if the book is part of a popular book series, etc.), and other such factors. In one embodiment, the value of the book may be identified as a numerical value. In another embodiment, the value of the book may be classified into one of several ratings or categories (e.g., an "A" rating, "B" rating, "C" rating, and so forth), each category representative of the popularity and value of a book. The value of the book may be represented by any type of value or categorization, in other embodiments. As one example, a novel written by a high-profile author in a popular fantasy book series may be given an "A" rating while a novel written by a relatively unknown author about an unpopular subject may be given the lowest rating. In some embodiments, the title value system 210 may map each rating category and/or numeric title value to a title value adjustment factor to be used alone or in combination with other factors described herein to determine the adjustment to apply to the initial order value.

The DDO calculation system 104 includes a lead time system 212. The lead time system 212 determines a total manufacturing time for the product, and other factors that may impact the capabilities of the manufacturer to create the product. For example, the lead time system 212 may consider the status of the one or more plants 108 (e.g., which plants and printing presses are scheduled to print at given times, have printing capacity at different times based on print production schedules, etc.). The lead time system 212 may consider the impact of creating the product at given times, which may impact the ability of the manufacturer to fulfill a given order in a demanded timeframe.

The DDO calculation system 104 includes a market analysis system 214. The market analysis system 214 determines an impact the current market may have on the ability of the product to sell. The market analysis system 214 may generally use information from market research system 112 to determine one or more characteristics in the open market that may impact the quantity of product that would sell. In other words, the market analysis system 214 may generally be a forward-looking system that provides a predictive measure to the calculation.

In some embodiments, the market analysis system 214 may analyze trends for products of a subject similar to the product to be printed. For example, for school textbooks, the market analysis system 214 may determine if a particular type of subject is seeing an increase or decrease in popularity. As another example, the market analysis system 214 may analyze one or more products from one or more companies to determine trends relating to the company or to one or more types of products sold by the companies.

The market analysis system 214 may analyze a reason for an increase or decrease in popularity of a particular product. For example, for a particular book that has experienced an increase in popularity, the market analysis system 214 may determine the reason for the spike in popularity, determine if the spike in popularity is sustainable, determine if the reason for the spike in popularity is a trait shared by the product to be printed, and finally calculate an impact of the book on the selling potential of the product to be printed. As one example, if the book experiencing the spike in popularity is a new book (published in the last five years), it may be determined that the spike could be sustainable, since the subject matter is recent. As another example, if the book is a century old, the market analysis system 214 may determine if the spike in popularity is sustainable or not (e.g., a subject of the book has become recently famous, and may or may not remain relevant). The market analysis system 214 may also factor in the type of subject (i.e., a cookbook may have one type of "lasting power", while a biography may have another type of "lasting power").

As another example, the market analysis system 214 may use an author of a book, or subject of a book, to determine if current market trends will have an impact on the product to be printed. For example, if an author or a subject of a book has recently become more famous, and the author or subject is related to the product to be printed, then the order of the product can be increased. The market analysis system 214 may be able to determine whether an increase (or decrease) in popularity of an author or subject is relatively permanent or temporary. For example, if the increase is in line with historical trends, an increase in the order may be applied, while if the increase opposes historical trends, the market analysis system 214 may wait to cause an increase in the order, or be more conservative in the increase of the order.

In some embodiments, the market analysis system 214 may apply weighting to the different market aspects. For example, some market trends may be deemed to be reliable, while other market trends may be more unstable. The market analysis system 214 may apply a confidence factor to each individual market trend, to avoid placing too much weight into an uncertain market trend.

In some embodiments, some of the aspects of the market analysis system 214 may be implemented in other systems. For example, market analysis may be implemented as part of the life cycle calculation system 202, as market trends may impact the life cycle of the product. As another example, market analysis may be implemented as part of the seasonality system 206, as market trends may be seasonal (i.e., a product may pick up sales in the spring or winter months). As another example, market analysis may be implemented as part of the title value system 210, as market trends may impact the value of the book based on the author or subject. While the market analysis system 214 is shown as a separate system for the ease of explanation in FIG. 2, it should be understood that in some embodiments, various aspects of the market analysis may be implemented in the other systems of the DDO calculation system 104.

Describing systems 202-214 in general, in some embodiments, the output of each system may generally be a value (e.g., a percentage), such as an individual adjustment factor. The value may generally relate to some form of risk in adjusting the initial order value. For example, for the life cycle calculation system 202, the value may represent how likely a book is to sell based on the age of the book and if newer versions of the book exist (more risk may be taken by the DDO system 100 and more downward adjustment may be applied is the book is older or superseded). For the seasonality system 206, the value may represent whether the book is "in season" or not (more risk can be taken by the DDO system 100 if the book is not in season as the order amount may be more likely to be inaccurate and there is possibly time to account for unanticipated demand). For the title value system 210, the value may represent how likely the book is to sell based on factors such as popularity (more risk can be taken, and more downward adjustment can be applied, for less popular publications). For the lead time system 212, the value may represent the capability of the manufacturer to fill modifications to the order (more risk can be taken with more manufacturer capacity to fulfill additions to the order after the initial print operation). The DDO calculation system 104 may convert the output of the various systems into a value via any method (e.g., equations or algorithms, mapping of considered factors to corresponding adjustment values, etc.) according to various embodiments.

The DDO calculation system 104 includes a weighting function 216 in some embodiments. The weighting function 216 utilizes the adjustment factors determined by the systems 202-214 to determine a final scaling factor to apply to the order. The weighting function 216 is configured to apply weights to the individual adjustment factors to determine the final scaling factor. In some embodiments, the weights may differ for the different individual adjustment factors. In some such embodiments, the weights may be determined based at least in part on an estimated importance of the factors to the accuracy of the final reduced amount of copies estimated to more closely match anticipated demand for the printed product. In some such embodiments, the weights may be determined in part based on feedback specified by the user 110. In one example, the weighting function 216 may give more weight to the seasonality system 206 output if the product is a textbook to be sold to students. As another example, the weighting function 216 may give more weight to the title value system 210 output if the user 110 has indicated the values assigned to titles should be emphasized in the calculation.

In one embodiment, the weighting function 216 may emphasize the digital compatibility of the product, as determined by the digital printing press compatibility system 204. In some embodiments, the weighting function 216 may apply a two-step process in which an adjustment is only applied if the product is determined to be compatible with digital press printing (e.g., if a determined level of digital printing compatibility is above a threshold level). If the product is determined to be incompatible with digital printing (e.g., if the compatibility level is below a threshold), no adjustment may be applied. If the product is determined to be compatible with digital press printing, the other factors may be determined, alone or in combination with a digital compatibility adjustment factor. In some embodiments, the digital press compatibility determination may not be applied as a separate step, but the digital press compatibility adjustment factor may be given a greater weight than the other factors in determining the final scaling factor.

In some embodiments, the factors used in determining the final scaling factor to apply to the initial amount to generate the final amount and/or the weighting applied to the factors may be determined or modified based on data about the product and/or input from the user 110. For example, in some implementations, different factors and/or weighting values may be applied based on a product type of the product to be printed. In some such examples, a first set of factors and/or first set of weights for the factors may be applied when the identified product is a book, a second set of factors and/or weights may be applied when the product is a magazine, a third set of factors and/or weights may be applied when the product is a printed access card, etc. In some implementations, different factors (e.g., life cycle, seasonality, title value) may be used for different types of printed products, or the factors may be defined in different manners (e.g., life cycle may be defined differently for a fiction book than a trade publication). In some implementations, the same factors may be applied to two different types of printed products, but the weightings applied to the factors may be different (e.g., title value may be emphasized more heavily for a fiction book than a trade publication).

It should be understood that the various components of DDO system 100 and/or DDO calculation system 104 may be implemented in various ways in different embodiments. In some embodiments, each of multiple components may be implemented using processing circuits including a processor and a computer-readable storage medium (e.g., memory) storing instructions that can be executed by the processor to implement the features described herein. In some implementations, various components (e.g., order management system 102, DDO calculation system 104, and/or automated plant delivery system 106) may be implemented using a processing circuit in which instructions corresponding to multiple components are stored in a computer-readable storage medium and the instructions corresponding to multiple components may be executed by a single processor, or multiple processors, to implement the features described in the present disclosure. It should be understood that all such implementations are contemplated within the scope of the present disclosure. Further, one or more components of DDO system 100 and/or DDO calculation system 104 may include a transceiver or other communication circuit configured to transmit data to and/or receive data from one or more external devices, such as a user device of the user and/or circuitry associated with printing presses and/or plants at which the printed product is to be delivered. For example, in some embodiments, a command to print the final amount of copies of the printed product may be transmitted from a transceiver of DDO system 100 to a circuit of a printing press or plant configured to cause the final amount of the printed product to be printed in response to receiving the command.

Figure 3:
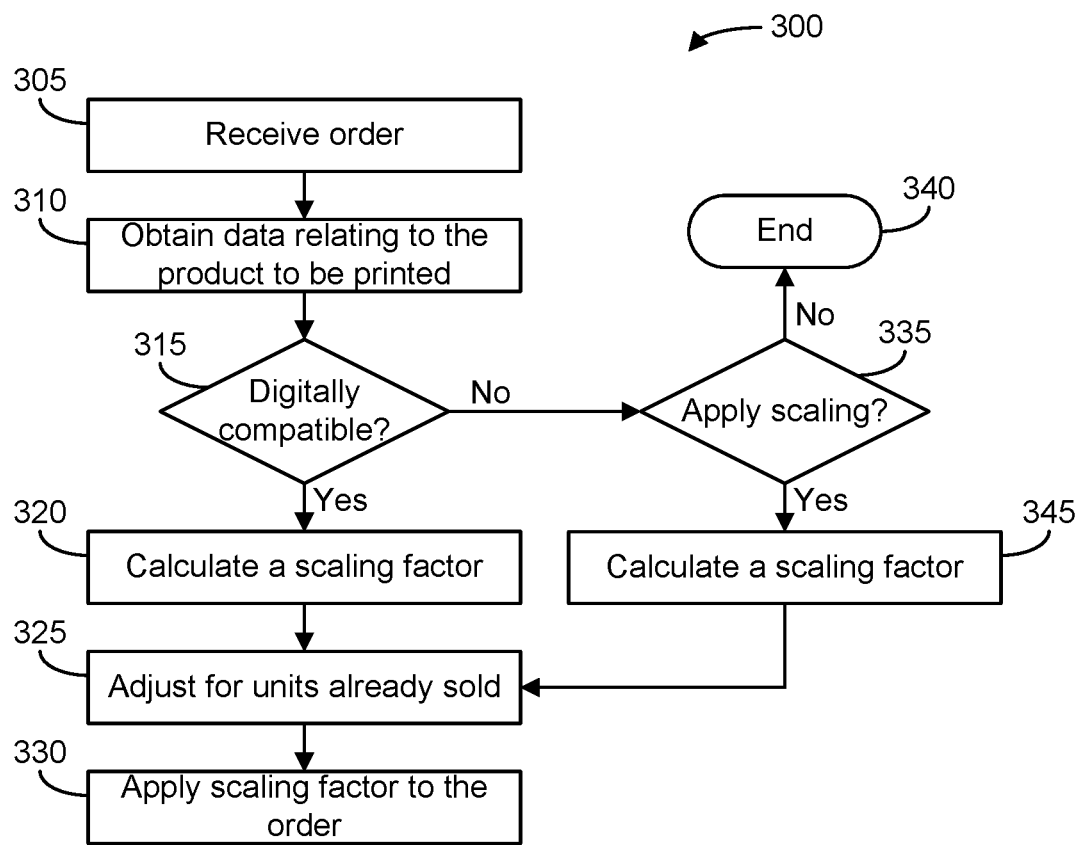
FIG. 3 is a flow diagram of a process for calculating a scaling factor for an order submitted by a user according to an illustrative embodiment.

Referring now to FIG. 3, a flow chart of a process 300 for calculating a scaling factor for an order is shown according to an exemplary embodiment. The process 300 includes receiving an order (block 305), the order detailing the product being ordered (e.g., a book) and the quantity of the product. The process 300 includes obtaining data relating to the product to be printed (block 310). For a book, the data may include, but is not limited to, the length of the book, the type of paper the book is to be printed on and the way the book will be bound, the type of text or imagery to be printed, the author(s) of the book, how many copies of the book have already been sold, when the book will be sold by the user, and the like. Such information may be obtained using an ISBN of the book, in some embodiments. Block 310 may include any type of data retrieval process from either the user or another outside source.

Process 300 further includes determining if the manufacturing of the product is digitally compatible (block 315). For example, for a book order, block 315 includes determining if the book can be printed reliably on one or more digital printing presses. If the book can be printed on digital printing presses, then the process 300 may allow for adjustment of the initial order amount, or may allow for a greater level of adjustment. If the book cannot be printed on digital printing presses, then the process 300 may disallow adjustment of the initial order amount, or may allow a lower level of adjustment. In such a scenario, since it may be more difficult to print more books at a later date, the process 300 may disallow adjustment or allow a lower level of adjustment to account for increased cost/difficulty to produce additional copies in the event the print operation is insufficient to meet demand.

In some embodiments, block 315, instead of making a yes or no decision, may determine how compatible an order is with the digital printing presses, and may use a weighted function that gives partial weight based on the compatibility. In such an embodiment, the process 300 may proceed to block 320 (described below) with an additional weighting factor introduced for the digital compatibility of the order.

If the order is compatible with digital presses, the process 300 includes calculating a scaling factor (block 320). The scaling factor is calculated based on the digital compatibility and the output from various subsystems of the DDO calculation system 104, as described in FIG. 2. As one example, the scaling factor may generally be represented by the following equation:

$$\text{scaling factor} = aDC + bLC + cTV + dS + eL + fMV$$

wherein a is the weight given to the digital compatibility (DC) of the order, and b, c, d, e, and f are weights to be applied to the life cycle (LC), title value (TV), seasonality (S), lead time (L), and market value (MV) factors, respectively. Each factor DC, LC, TV, S, L, MVC (and other possible factors that may be included) may be represented by a value. In some embodiments, the digital compatibility factor may be considered separately at block 315 and may not be applied as a factor in the scaling factor determination. Each of the relative weights may be set by the DDO calculation system 104 and/or provided/adjusted by the user 110. In one embodiment, life cycle may be given the greatest weight, followed by seasonality, then title value, then lead time, then market value. In various embodiments, the different adjustment factors may be given different weights and/or different relative weighting levels compared to one another. It should be understood that these particular factors are provided solely for the purposes of illustration; in other implementations, more, fewer, or different factors may be applied to determine the final scaling factor, and all such implementations are contemplated within the scope of the present disclosure.

In some embodiments, the process 300 further includes adjusting for units already sold (block 325). For example, when providing order details to the DDO system 100, the user may indicate that some of the product has already been sold (e.g., pre-sold). This may impact the application of the scaling factor, as the DDO system 100 may modify the scaling factor to reduce the initial amount by a smaller amount to account for the units already sold. In some implementations, the sold units may be subtracted from the initial order amount before the scaling factor is calculated, and the scaling factor may be determined using only the portion of the order for which firm offers or orders have not already been received.

The process 300 further includes applying the scaling factor to the order (block 330). The scaling factor, as described above, may be a value that can be multiplied with the quantity provided by the user to determine the adjusted quantity. In some embodiments, if the scaling factor is greater than 1, it is an indication that the order will be increased (e.g., the user will receive more product than requested in the order), and if the scaling factor is less than 1, it is an indication that the order will be decreased.

If the order is not digitally compatible (block 315), the process 300 includes determining if any scaling should be applied to the order (block 335). For example, in some embodiments, the process 300 proceeds to end without applying scaling (block 340), and the order will proceed as specified by the user. In some embodiments, the process 300 includes calculating the scaling factor based on other factors (block 345). In some such embodiments, the scaling factor may be adjusted based on the digital incompatibility, and may be lower than if the product was compatible with printing on a digital press (e.g., assuming the other factors are the same). In some embodiments, the process then adjusts for units already sold (block 325) and applies the scaling factor to the order (block 330).

Figure 5:
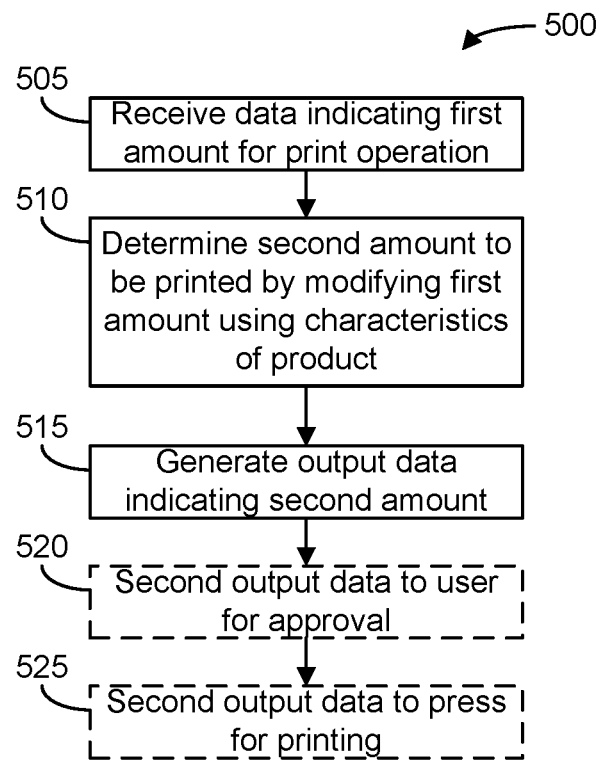
FIG. 5 is a flow diagram of a process for determining an amount of a printed product to be printed according to an illustrative embodiment.

Referring now to FIG. 5, a flow diagram of a process 500 for determining an amount of printed product to be printed using a print process is shown according to an illustrative implementation. The process 500 includes determining a first amount of product to be printed according to a print operation (block 505). The process 500 includes determining a second amount of the product to be printed by adjusting the first amount using characteristics of the product (block 510), such as life cycle, compatibility with digital press printing, seasonality, title value, market value, and/or other factors. In some embodiments, the adjustment may be a zero adjustment (e.g., if the product is incompatible with digital printing and/or very early in its life cycle). The process 500 further includes generating output data indicating the second amount of the product (block 515). The output data optionally may be sent to a user for approval of the modified amount (block 520) and/or sent to one or more printing presses to print the second amount of the printed product (block 525).

Some embodiments of the present disclosure may be implemented on a user device or other device external to an order system. For example, in some embodiments, a user device may perform a process for providing data to an order system used to determine a modified proposed amount of printed product to be printed and allowing a user to approve or reject the modified amount. In some such implementations, the user device may identify a first (e.g., initial) amount of a printed product for a print operation to generate the printed product using a printing press. In some implementations, the user device may determine the initial amount based on input from the user. The user device may transmit the initial amount and other order data to the order system. The order data includes a characteristic of the printed product, such as, but not limited to, a life cycle status, a digital printing press compatibility, a seasonality, a market value, and/or a product identifier (e.g., ISBN) used by the order system to identify one or more of these or other characteristics. The user device may receive, in response to the transmitted order data, including the initial amount, a second amount of the product to be printed. The second amount may be determined using the first amount and the characteristic in a manner similar to that described above.

The user device may receive input data indicating whether the user has approved the second amount to be printed. In some embodiments, the user device may generate a user interface on a display of the user device through which the user can provide the input via one or more input devices of the user device (e.g., mouse, touchscreen, buttons, etc.). The input may indicate whether the user approves of the proposed modified amount. The user device may transmit a command to the print order system based on the input data indicating whether the second amount is approved for printing. In some implementations, if the second amount is approved, the user device may transmit a command indicating the second amount has been approved. In some such implementations, the command may cause the print order system to implement the print operation on the printing press using the second amount (e.g., by transmitting the order to a control system configured to cause the printing press to print the order, transmitting the order to a terminal of a technician who operates the press to print the order, etc.). In some implementations, if the second amount is rejected, the user device may transmit a command indicating the second amount has been rejected. In some such implementations, the command may cause the print order system to implement the print operation on the printing press using the initial amount, rather than the second amount. In some implementations, the user device may transmit a command indicating the second amount has been modified. In some such implementations, the command may cause the print order system to implement the print operation on the printing press using the modified second amount. In various implementations, the second amount may be determined using the first amount and the characteristic in any manner described herein.

Figure 6:
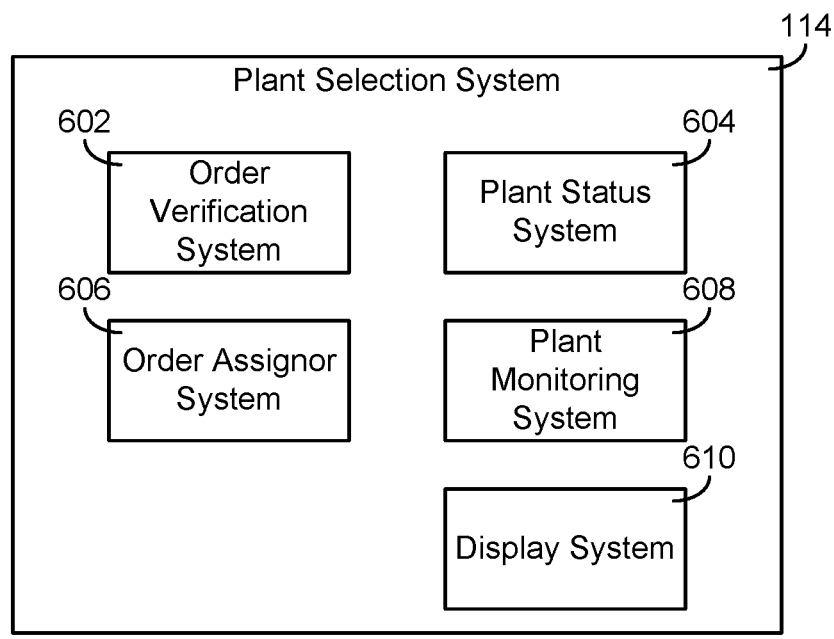
FIG. 6 is a detailed block diagram of the plant selection system of the DDO system according to an illustrative embodiment.
Figure 7:
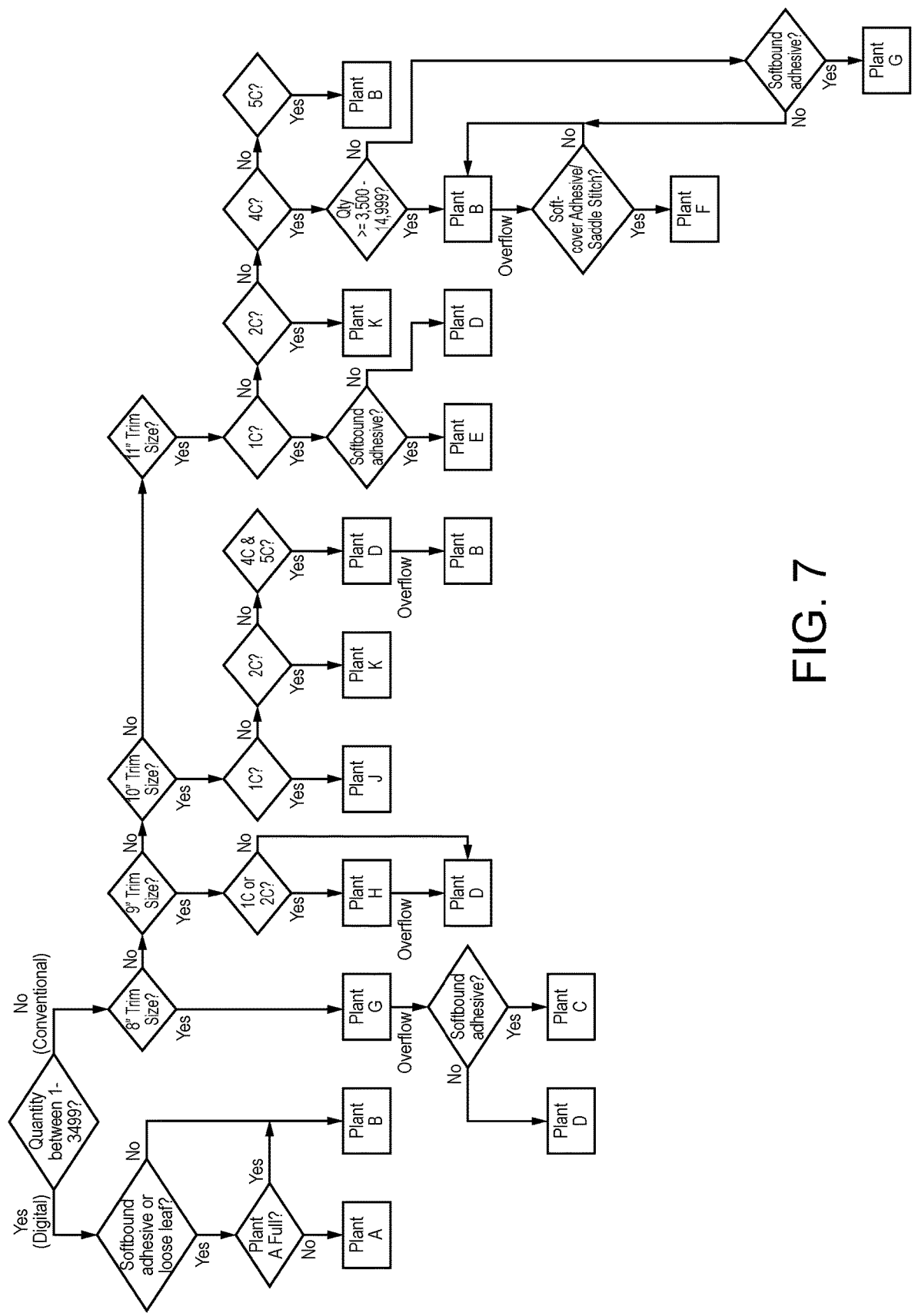
FIG. 7 is a flow diagram of a plant selection process according to an illustrative embodiment.

Referring now to FIGS. 6-7, the activities of the plant selection system 114 are described in greater detail. After an order has been determined by the DDO calculation system 104 and the order management system 102 (i.e., after the quantity of the order has been adjusted upwards or downwards), the order may be submitted to one or more plants 108 for printing. The plant selection system 114 may generally be configured to select one or more plants 108 for the printing job, manage the workload at each plant 108, and determine one or more factors that may impact the ability of the order to be fulfilled by the DDO system 100.

The plant selection system 114 may include an order verification system 602 configured to verify the order is ready for execution. For example, the order verification system 602 can verify that a user has approved an adjusted order. As another example, the order verification system 602 can verify that the user has paid for the order and that printing of the product can begin. The order verification system 602 may go through any number of verification steps to ensure that the product is not printed early or erroneously. In some embodiments, the order verification system 602 can verify one or more attributes (e.g., trim size of a book) relating to the product, which can be used to help determine which plant 108 is equipped to produce the order.

The plant selection system 114 may include a plant status system 604 configured to track the status of each plant 108. For example, the plant status system 604 may keep track of one or more orders each plant 108 is currently tasked with printing, and one or more orders each plant 108 is scheduled to print in the future. In other words, the plant status system 604 may track the workload of each plant 108 to help the plant selection system 114 ensure that no single plant is overloaded with orders. The plant status system 604 may account for the amount of time it takes to execute a particular order. For example, the plant status system 604 may identify plants with more complex orders and may indicate to the plant selection system 114 that such plants may not be able to handle an additional workload. The plant status system 604 may, for example, account for a schedule of operation of each plant 108. In some embodiments, the plant status system 604 may establish a priority order or queue of plants available for a particular type of printing task.

The plant selection system 114 may include an order assignor system 606 configured to select a plant (or more than one plant) for executing a particular order. The plant selection may be based on various factors, such as the type of printers available at each plant, the current workload at each plant, a deadline for the order, one or more product specifications, and the like.

In some embodiments, the order assignor system 606 may select a plant based on the attributes of the product to be printed. For example, as shown in FIG. 7, the order assignor system 606 may identify a quantity of the product to be printed, the trim size of the product, a priority rank of the product, and other attributes to determine a suitable plant 108. As one example, some printers and plants may only be capable of, or may be best equipped for, printing books with a particular trim size, type of paper, type of bind, type of ink, etc. As another example, some plants may have a maximum capacity or availability (e.g., order above a threshold may not be able to be fulfilled by a particular plant). The order assignor system 606 may determine which plants 108 are suitable or not suitable for handling a particular order, and may select from among the suitable plants. In some embodiments, the order assignor system 606 may identify a number of suitable plants and may use a queue or priority rank to select an available plant for executing the order.

In various embodiments, the plants 108 may be any combination of plants owned by the manufacturer of the product and third party plants or manufacturer. The order assignor system 606 may be configured to determine whether a particular order is suitable for providing to a third party plant. The order assignor system 606 may determine the availability of one or more printers of the third party plant and one or more local printers, and determine whether to send the order to the third party plant.

The plant selection system 114 may include a plant monitoring system 608. The plant monitoring system 608 may generally monitor the performance of each plant 108. For example, the plant monitoring system 608 may track the current workload of each plant 108, and may determine an availability of each plant 108 for future orders. Further, the plant monitoring system 608 may maintain a schedule for one or more plants 108. In some embodiments, the plant selection system 114 may assign future jobs for one or more plants, and the plant monitoring system 608 may monitor the schedule of future jobs for the plants to ensure that no job is delayed or no plant is overloaded with jobs.

In some embodiments, the plant selection system 114 (or the DDO system 100) may be configured to generate a display relating to the various orders and plants. The plant selection system 114 is shown to include a display system 610 configured to generate a user interface for display on a user device (e.g., desktop, laptop, mobile device, etc.). The user interface may generally allow a user to view orders, to view the status of one or more plants, and to provide inputs relating to the execution of the orders at the one or more plants. The user interface may be accessible by, for example, an administrator or manager in charge of the printing process or one or more plants, or by a customer (e.g., to purchase orders, to modify orders, to view modified orders created by the DDO system 100, etc.).

Referring generally to FIGS. 8-13, example user interfaces that can be generated by the display system 610 are shown. Referring to FIG. 8, an example user interface 800 is shown that may be presented to a manager or administrator of the DDO system 100. In the illustrated implementation, user interface 800 includes a selection field 805 allowing the user to select from among several interfaces to be shown. The selected interface can be displayed by selecting a retrieve button 810. In user interface 800, an "Orders Requiring Purchasing" interface has been selected, which results in a table 815 being displayed. Table 815 is shown to include a list of orders and information for each order. In the example of FIG. 8, table 815 is providing a list of orders not yet paid for by the customers ordering the product. Table 815 may generally include information for each order such as an ISBN and title (or other identifier), the customer ordering the product, the location at which the order will be produced (e.g., at which plant the product will be printed), an order status, and a shipping date (or other deadline). User interface 800 may generally allow a manager or user to the DDO system 100 to view the status of upcoming orders to be executed.

Referring now to FIG. 9, an example user interface 900 is shown including a table 915 of orders that have been paid for and are awaiting assignment to a plant. As described above, in various embodiments, an order may be automatically assigned to a plant, or may be assigned to a plant by a user of the DDO system 100. Table 815 shows a list of orders ready for printing. In some embodiments, the user may use user interface 900 to assign an order to one or more available plants for either immediate printing or printing at a future date. In some embodiments, the orders may already be assigned to one or more plants for printing, and the user may be able to view the status of each order along with other information (e.g., one or more factors that influenced the selection of a particular plant) on user interface 900. In some embodiments, the user may be able to adjust an order via user interface 900 (e.g., to assign an order to a different plant), or to confirm the selection of one or more plants by the DDO system 100 or another user.

Referring to FIG. 10, an example user interface 1000 is shown providing a table 1015 listing orders waiting to start production. In the embodiment of FIG. 10, one or more plants have been selected for the orders, and the orders are awaiting production. Similar to FIG. 9, the user may be able to adjust an order via user interface 1000 (e.g., to assign an order to a different plant) or confirm the selection of one or more plants by the DDO system 100 or another user.

Referring to FIG. 11, an example user interface 1100 is shown providing a table 1115 showing information relating to the order adjustment process as described in the present disclosure. In some embodiments, the DDO system 100 may be able to generate a report detailing the results of a process of adjusting a customer order. In the example of FIG. 11, a number of orders for a particular customer are listed, identified by an order number and ISBN. The table shown in FIG. 11 includes an adjustment column which may provide information relating to the type of adjustment applied to the order submitted by the customer. For example, the order may be automatically adjusted by the DDO system 100 or may be manually adjusted by the customer or a user of the DDO system 100. In some embodiments, user interface 1100 includes a location selection field 1105 allowing a user to filter the data by location and/or a status selection field 1110 allowing a user to filter according to an internal status.

The table is shown to include a savings column, which may indicate a cost adjustment related to the adjustment of the order. For example, the order adjustment may result in higher or lower costs relating to the production or sale of the product. The customer may be able to view additional details relating to each order through the user interface of FIG. 11.

Figure 12:
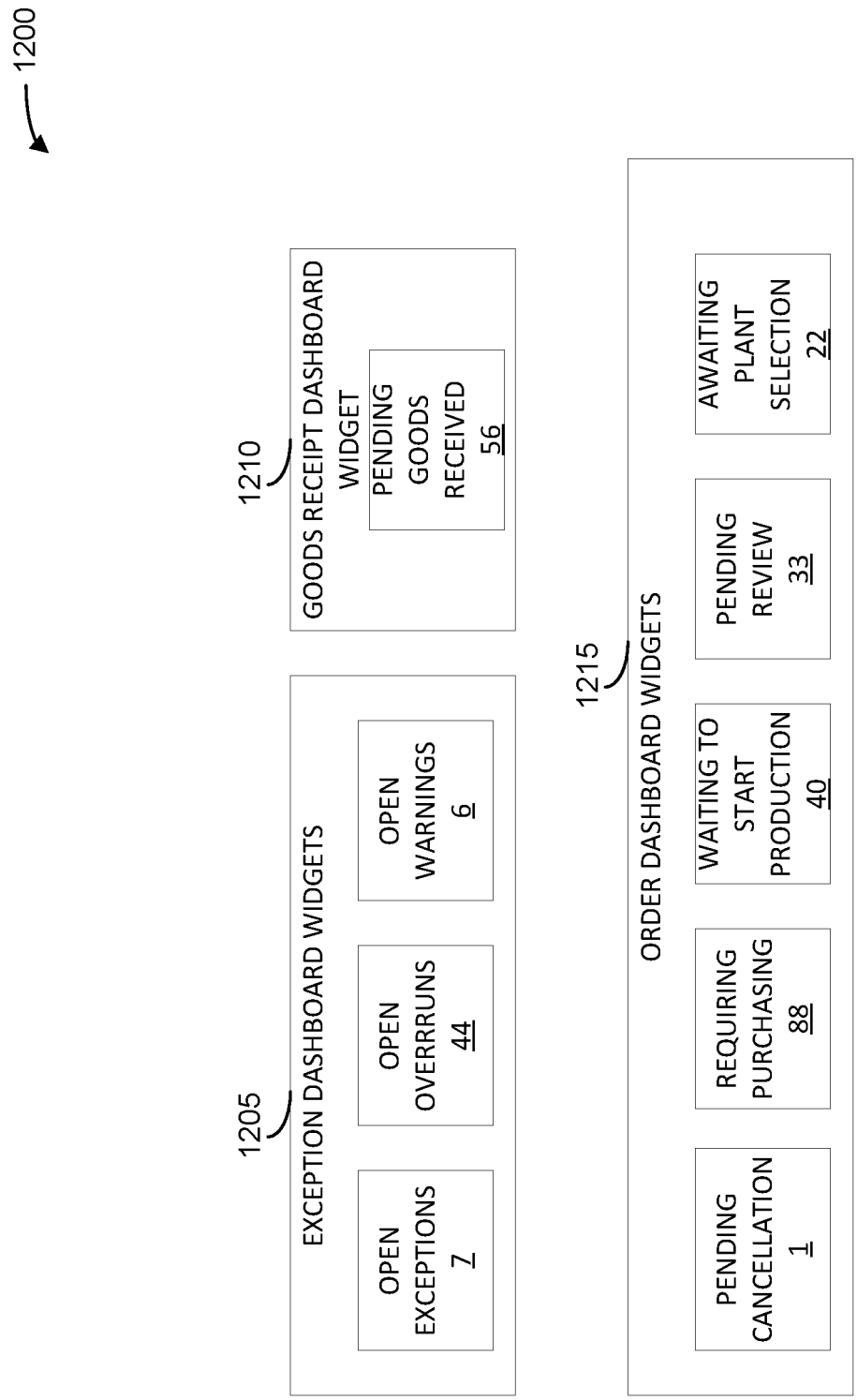
FIG. 12 is a user interface showing a main dashboard according to an illustrative embodiment.

Referring to FIG. 12, an example user interface 1200 is shown with a plurality of widgets. User interface 1200 may be a main interface allowing a user to access different portions of the data maintained by the DDO system 100 and/or take actions with respect to the data. In some embodiments, the DDO system 100 may be configured to generate a number of widgets on the user interface, each widget related to a subset of orders. For example, user interface 1200 may include exception dashboard widgets 1205 for orders for which an exception or warning has been raised, a goods receipt dashboard widget 1210 for orders awaiting receipt of goods, and order dashboard widgets 1215 for orders in various stages of the ordering/production process. In some implementations, exception dashboard widgets 1205 may include widgets for orders where there are open exceptions/faults, orders where there are open overruns, and/or orders where there are open warnings awaiting review. In some implementations, order dashboard widgets 1215 may include orders pending cancellation, orders requiring purchasing, orders waiting to start production, orders pending review, and/or orders awaiting plant selection. In some implementations, the widget may include some information about the orders in question, such as how many orders fall under the particular category associated with the widget. Upon selection of a widget, the user may be directed to a user interface such as that shown in FIGS. 8-10.

In some embodiments, widgets may be created for groups of orders having issues. For example, a widget for "open exceptions" may be selected, upon which the user may be presented with a list of orders currently with paused production due to an error or other situation at one or more plants. As another example, a widget for "open overruns" may be selected, upon which the user may be presented with a list of orders currently being impacted by a high workload at one or more plants. It should be understood that any number of widgets may be generated for the user interface allowing the user to view orders sharing an attribute.

In various embodiments described above, the systems described may be modified to include fewer, additional, or different components. For example, the DDO calculation system of FIG. 2 may be modified to include different components than illustrated in FIG. 2, such as alternative components appropriate for different implementations. All such modifications are contemplated within the scope of the present disclosure.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed as a "means plus function" element unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media that can be accessed by a machine with a processing circuit (e.g., processor). By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., mere signals in space).

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software implementations of the present disclosure could be accomplished with standard programming techniques with rule-based logic and other logic to accomplish the various steps. It should also be noted that the word "component" as used herein is intended to encompass implementations using one or more lines of software code, and/or hardware implementations, and/or equipment for receiving manual inputs.

What is claimed is:

1. A system comprising:
a transceiver configured to transmit commands to a printing press, the commands used by the printing press to execute print operations to generate printed products; and
a processing circuit configured to:
receive data indicating a first amount of a printed product for a print operation to generate the printed product using a printing press;
receive a characteristic of the printed product, wherein the characteristic relates to a demand for the printed product and information printed in the printed product;
determine a second amount of the printed product to be printed by the printing press under the print operation by modifying the first amount using the characteristic of the printed product; and
control the printing press to print the second amount of the printed product by transmitting, using the transceiver, one or more commands to the printing press to print the second amount of the printed product.

2. The system of claim 1, wherein the printing press comprises at least one of a web offset printing press, a gravure printing press, or a digital printing press.

3. The system of claim 1, wherein the processing circuit is configured to apply a rule to the first amount of the printed product to determine the second amount, the rule relating to the characteristic of the printed product, wherein the processing circuit is configured to determine the second amount to be a first value in response to the characteristic having a first characteristic value, and wherein the processing circuit is configured to determine the second amount to be a second value different than the first value in response to the characteristic having a second characteristic value.

4. The system of claim 1, wherein the processing circuit is configured to determine the second amount using a life cycle stage of the printed product.

5. The system of claim 4, wherein the processing circuit is configured to reduce the first amount by a greater factor to determine the second amount in response to the life cycle stage being later in a life cycle of the printed product than when the life cycle stage is earlier in the life cycle.

6. The system of claim 1, further comprising a plant selection system configured to automatically select at least one of the printing press or a plant in which the printing press is located to print the second amount of the printed product based on at least one of the characteristic of the printed product or the second amount of the order.

7. The system of claim 6, wherein the plant selection system is configured to automatically select the at least one of the printing press or the plant based on comparison of the second amount of the order to a threshold, the plant selection system configured to select a digital press in response to the second amount of the order being below the threshold.

8. A method comprising:
identifying a first amount of a printed product for a print operation to generate the printed product using a printing press;
transmitting, by a processing circuit to a print order system, the first amount and order data comprising a characteristic of the printed product, wherein the characteristic relates to a demand for the printed product and information printed in the printed product;
receiving, by the processing circuit in response to the transmission of the first amount and the order data, data indicating a second amount of the printed product to be printed by the printing press under the print operation, the second amount determined using the first amount and the characteristic;
receiving input data indicating whether a user has approved the second amount to be printed; and
controlling, by the processing circuit, the printing press to print the second amount of the printed product by transmitting, by the processing circuit, a command to the print order system based on the input data, the command indicating whether the second amount of the printed product is approved for printing by the printing press, wherein the command is configured to cause the print order system to implement the print operation on the printing press using the second amount.

9. The method of claim 8, wherein the input data indicates rejection of the second amount, and wherein the command is configured to cause the print order system to implement the print operation on the printing press using the first amount.

10. The method of claim 8, wherein the input data indicates modification of the second amount to a modified second amount, and wherein the command is configured to cause the print order system to implement the print operation on the printing press using the modified second amount.

11. The method of claim 8, wherein the printing press comprises at least one of a web offset printing press, a gravure printing press, or a digital printing press.

12. The method of claim 8, wherein the second amount is determined using a life cycle stage of the printed product.

13. The method of claim 12, wherein the second amount is lower in response to the life cycle stage being later in a life cycle of the printed product than when the life cycle stage is earlier in the life cycle.

14. A system comprising:
   a transceiver configured to transmit commands to a printing press, the commands used by the printing press to execute print operations to generate printed products; and
   a processing circuit configured to:
   receive data indicating a first amount of a printed product for a print operation to generate the printed product using a printing press;
   receive a characteristic of the printed product related to information printed in the printed product, wherein the characteristic defines a particular edition of the printed product, the particular edition related to a demand for the printed product;
   determine a second amount of the printed product to be printed by the printing press under the print operation by modifying the first amount using the characteristic of the printed product;
   select the printing press from a plurality of printing presses based on one or more characteristics of the printed product, the second amount, and one or more future scheduled print jobs of each of the plurality of printing presses; and
   transmit, using the transceiver, a first command to the printing press configured to cause the printing press to print the second amount of the printed product.

* * * * *